J. REED.
STRAP ATTACHMENT.
No. 11,432. Reissued July 10, 1894.
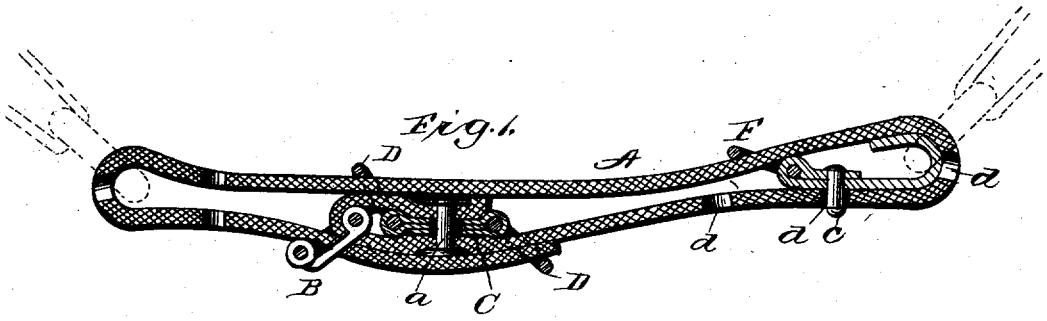
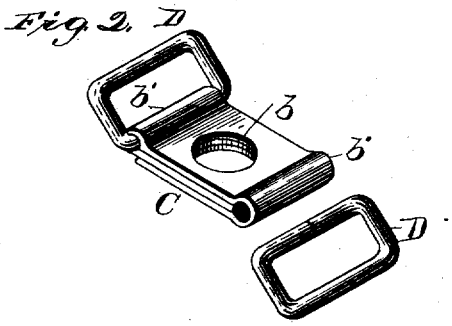
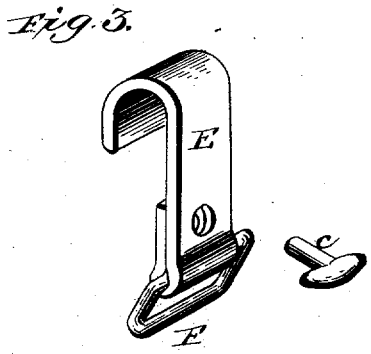
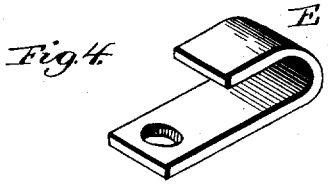
Witnesses:
J. M. Fowler Jr.
J. T. O'Neale.
Inventor:
Jay Reed
By A. H. Evans & Co
Attorneys.
THE NORRIS PETERS CO., PHOTO-LITHO., WASHINGTON, D. C.

UNITED STATES PATENT OFFICE.

JAY REED, OF BUTLER, MISSOURI.

STRAP ATTACHMENT.

SPECIFICATION forming part of Reissued Letters Patent No. 11,432, dated July 10, 1894.

Original No. 509,449, dated November 28, 1893. Application for reissue filed February 10, 1894. Serial No. 499,989.

*To all whom it may concern:*

Be it known that I, JAY REED, a citizen of the United States, residing at Butler, in the county of Bates, State of Missouri, have invented certain new and useful Improvements in Strap Attachments, of which the following specification contains a full, clear, and exact description, reference being had to the accompanying drawings, in which—

Figure 1, shows my improvements applied to a hames strap, the parts being in longitudinal vertical section, and the lower ends of the hames being shown in dotted lines. Fig. 2, is a perspective of the loop-carrying plate removed, and one of its loops being detached. Fig. 3, is a similar view of the hooked bearing plate with its T-headed button detached, and Fig. 4, shows an ordinary bearing plate.

The invention has for its object to provide a strap with buckle, loop and bearing-plate attachments, adapted especially for use as a harness attachment but which may be used wherever it may be found desirable; also to provide a loop-carrier which will be cheap to manufacture, and which may be applied to straps generally, and which may be secured thereon when concealed within the folds of the strap, by means of an ordinary riveting machine; also to provide such a harness strap with a hooked bearing plate capable of being adjusted toward and from the buckle so that it will always lie within the bend or bight of the strap, whether the strap be lengthened or shortened.

The invention will first be described and then specifically pointed out in the claims.

A, represents a strap especially designed for use in adjustably connecting the lower ends of a hames though it may of course be used wherever found desirable. This strap is passed at one end through a buckle and through the upper and lower loops D, D of the loop-carrier C, over which it is folded as clearly shown in Fig. 1, a rivet *a* passing through both folds of the strap and through the rivet aperture *b* in the carrier C. This loop-carrier C formed of a strip of sheet metal, both ends of which are folded over upon it on the same side, and there overlapped; the three layers of the carrier thus formed, being about the same length, and provided with registering apertures which constitute the rivet aperture *b*. This carrier at its ends is provided with loop eyes *b'* which eyes are formed by curving or rounding the sheet metal strip at its bends.

The diameter of the aperture *b* it will be noticed is out of all proportion to the size of rivet used being many times as large, and this is of the greatest practical value for the reason that it enables the riveting to be done by a riveting machine.

When the strap is folded over the carrier C, as in Fig. 1, its aperture *b* is of course concealed, and if said aperture was only large enough to just admit the passage of the rivet, it will be seen that when brought into proper position, for the riveting operation, the rivet in all probability would not register with the aperture, but would strike the carrier plate to one side thereof and thus either bend the rivet and clinch it on the strap above the carrier or bend the carrier out of shape. But by greatly enlarging the rivet aperture as shown clearly in Figs. 1 and 2, the machine will drive the rivet therethrough every time, notwithstanding it cannot be seen by the operator. I also find in practice another result following the use of such enlarged aperture, viz: the leather will be so compressed by the riveting plunger and anvil, that it will be forced into and fill the said enlarged aperture around the rivet. By forming the carrier of a single strip bent upon itself at both ends, and apertured through the three layers thus formed, a single rivet will not only serve to secure the carrier to the strap, but will also secure the overlapped ends of the sheet metal strip to the middle portion, and thus no amount of strain on the eyes *b'* can pull the overlapped ends apart. The three layers or members of the carrier lie very close together, and the whole forms a very neat, compact and readily applied device, which will be found highly useful for straps generally. The loops D, D, may be either connected with the carrier C while it is being formed, or afterward, as may be found desirable.

Referring now to Fig. 1, it will be seen that the right bend of the strap is provided with a hooked wear or bearing plate which is a common feature in such straps, but in my construction the plate E, is provided with a fold at the end opposite its hook, and this fold forms an eye which receives a loop F, and both thicknesses of the plate are apertured for the passage of the stem of the T-button *c* which serves to secure the eye against spreading as its inner end is upset on the hooked side of the plate, while the head or cross piece of the button crosses the hole *d* in the strap, when the plate E is in position, and thus securely holds it against displacement. This bearing plate may be cast with the loop F if desired.

By bringing the head of the button at right angles to the position shown in Fig. 1, it may be withdrawn through the hole *d* and inserted in another, either nearer to or farther from the buckle, according to whether the strap is to be shortened or lengthened for the proper adjustment of the lower ends of the hames.

Having thus described my invention, what I claim, and desire to secure by Letters Patent of the United States, is—

1. The loop-carrier C for straps, consisting in a single strip of sheet metal bent upon itself at both ends, and forming three superposed layers; the carrier thus formed having a single central rivet aperture through its three folds or layers, and having loop eyes at its ends formed by the bends in said strip, and the loops mounted in said eyes, substantially as herein described.

2. The loop-carrier C for straps, consisting in a single strip of sheet metal bent or folded upon itself at both ends, and said ends overlapping each other, a rivet aperture extending through all three folds or layers of the carrier, and of a diameter greatly in excess of the diameter of the rivet used therewith, eyes at the ends of the holder and formed by the bends in said strip, and strap loops D mounted in said eyes, substantially as herein described.

3. A harness attachment comprising the strap folded upon itself at one end, a buckle held by the bend of the strap, a loop-carrying plate between the overlapped portions of said strap beyond the buckle, and independent thereof and formed of a strip of sheet metal bent upon itself at both ends, and overlapped at said ends, eyes being formed by said two bends, a rivet extending through both thicknesses of the strap, and through all three layers of the said carrier, and oppositely extending loops mounted in said eyes, and through which and the intermediate buckle loop the free end of said strap may be passed, substantially as herein described.

4. A harness strap provided with a series of apertures, and with a buckle at one end, and an adjustable hooked bearing plate in the bend of the strap, beyond and separate from the buckle and provided opposite its hooked end on the same side therewith, with a loop for the strap, and on its opposite side with a T-button engaging an aperture in the strap, whereby the bearing plate may be readily adjusted toward and from the buckle, substantially as herein described.

JAY REED.

Witnesses:
THOMAS J. WRIGHT,
W. COYL.